United States Patent [19]

Tomiyama et al.

[11] Patent Number: 5,714,024
[45] Date of Patent: Feb. 3, 1998

[54] MARKING MATERIAL FOR A POWER TRANSMISSION BELT/BELT SLEEVE AND METHOD OF MAKING A POWER TRANSMISSION BELT/BELT SLEEVE USING THE MARKING MATERIAL

[75] Inventors: Toshio Tomiyama, Takigun; Kyoichi Mishima, Kobe, both of Japan

[73] Assignee: Mitsuboshi Belting Ltd., Kobe, Japan

[21] Appl. No.: 443,471

[22] Filed: May 18, 1995

[30] Foreign Application Priority Data

Nov. 28, 1994 [JP] Japan ................................ 6-319048

[51] Int. Cl.⁶ ............................... B41M 3/12; B41M 1/32
[52] U.S. Cl. ........................................ 156/137; 156/307.3
[58] Field of Search ................................ 474/265; 156/137, 156/138, 139, 140, 307.3, DIG. 51, 141, 309.6; 152/367, 524, DIG. 12

[56] References Cited

U.S. PATENT DOCUMENTS

| 4,929,820 | 5/1990 | Jespersen | 235/487 |
| 5,298,100 | 3/1994 | Franchino et al. | 156/137 |

FOREIGN PATENT DOCUMENTS

| 5-42754 | 2/1993 | Japan. |
| 5-104654 | 4/1993 | Japan. |

Primary Examiner—Michael W. Ball
Assistant Examiner—Michael A. Tolin
Attorney, Agent, or Firm—Wood, Phillips, VanSanten, Clark & Mortimer

[57] ABSTRACT

A marking material having a substrate layer defined by a first rubber compound. A mark is applied to the substrate layer, which mark is defined by a second rubber compound that visibly contrasts with the first rubber compound.

2 Claims, 3 Drawing Sheets

MARKING MATERIAL FOR A POWER TRANSMISSION BELT/BELT SLEEVE AND METHOD OF MAKING A POWER TRANSMISSION BELT/BELT SLEEVE USING THE MARKING MATERIAL

BACKGROUND OF THE INVENTION

1. Field of the Invention

This invention relates to power transmission belts defined at least in part by a rubber compound and, more particularly, to a marking material that can be applied to the power transmission belt to define a visible mark, that may be a name, model number, trademark, etc. pertaining to the power transmission belt. The invention also relates to a method of manufacturing a power transmission belt and applying the inventive marking material.

2. Background Art

Manufacturers of power transmission belts place identifying material on their products for a variety of purposes, among these being to identify a company name, a type of belt, a model number, a trademark, etc. Ideally, the identifying material remains intact and visible on the power transmission belt for its useful life.

It is known to make a transfer marking material with a substrate that is a plastic film, such as acetate or nylon, or release paper, with a mark printed thereon using an unvulcanized, colored rubber. This transfer marking material is normally adhered to a molding drum upon which various power transmission belt layers are sequentially wrapped. In an exemplary construction, a covering canvas, a first rubber layer, load carrying cords, and a second rubber layer are consecutively wrapped around the molding drum and the transfer marking material adhered thereto. A jacket is then placed over the product which is vulcanized. After the vulcanization process is completed, the jacket is removed and the substrate is peeled from the vulcanized belt/belt sleeve.

This type of mark is prone to generating noise as it contacts a cooperating pulley. To attempt to alleviate this problem, it is known to use a marking paper which has both ends shaped in a regular or irregular wavy pattern. Through vulcanization, the mark is transferred from the back of the paper to the power transmission belt. After transfer, the paper is removed from the belt.

Belts produced according to this process have one prevalent problem. More specifically, the applied mark either resides in a depression in the belt surface on which it is applied or projects outwardly therefrom after the substrate is removed. This accounts for a problem, particularly in systems in which the surface with the mark thereon drives/is driven by a cooperating pulley. For example, serpentine belts are commonly used in automobile engine compartments, with the back side surface of the belt, which commonly carries the identifying mark, engaging pulleys associated with various auxiliary equipment on the automobile. The belt is wrapped around several components, with the backside thereof engaged also by a tensioner to compensate for elongation. Flat pulley surfaces that engage the marked surface, and particularly the flat surface on a tensioner, tend to vibrate upon encountering the projecting or depressed area where the mark resides. Appreciable vibration may be induced to the tensioner, even with very small irregularities resulting from the application of the mark, thereby generating unwanted noise.

It is known to transfer a mark without producing a difference in the level of the mark and the surface to which it is applied. Exemplary are the systems disclosed in Japanese Patent Laid-Open Nos. 42754/1993 and 104654/1993. According to the methods disclosed thereon, a mark is transferred to a canvas layer that is impregnated with unvulcanized rubber. A substrate carrying the mark is removed before the belt or belt sleeve is vulcanized to effect unification of the belt/belt sleeve and mark carried by the substrate.

It is also known to transfer a mark to a canvas impregnated with unvulcanized rubber and remove the substrate before wrapping the canvas around a molding drum and carrying out vulcanization. The mark is prone to staining and deformation when the canvas with the substrate removed is transported and wrapped around the molding drum.

Further, the application of the mark to the canvas, prior to incorporation of the canvas into the power transmission belt, may complicate the belt formation process and increase the manufacturing time.

It is also known to press a substrate, with a mark thereon, against a surface of a vulcanized belt/belt sleeve and to thereafter remove the substrate after the transfer is effected.

Normally, in forming power transmission belts by progressively building components upon a molding drum, a release agent is applied to the drum to facilitate removal of the vulcanized belt/belt sleeve from the molding drum or other vulcanizing equipment. This release agent makes it difficult to maintain the mark with the substrate on the molding drum in a desired position before application of the initial belt layer. The substrate and mark are prone to falling off the molding drum before the first belt component is wrapped or shifting as the first belt component initially contacts the substrate and mark. Removal of the release agent would require additional steps.

SUMMARY OF THE INVENTION

In one form of the invention, a marking material is provided having a substrate layer defined by a first rubber compound. A mark is applied to the substrate layer, which mark is defined by a second rubber compound that visibly contrasts with the first rubber compound.

The second rubber compound has at least one of a different brightness and a different color than the first rubber compound.

The substrate layer may be one of paper and nonwoven fabric impregnated with the first rubber compound.

In one form, the first rubber compound is a vulcanizable rubber compound.

In one form, the substrate material is impregnated with the first rubber compound which is dried before the mark is applied to the substrate layer.

Silicone oil may be provided in the second rubber compound in an amount of 0.15 to 0.40 parts by weight of silicone oil solution per 100 parts by weight of the second rubber in the second rubber compound.

The invention contemplates the above structure in combination with a power transmission belt/belt sleeve having an exposed surface, with the marking material being applied to the exposed power transmission belt/belt sleeve surface.

The exposed surface on the power transmission belt/belt sleeve may be defined by a material that becomes homogeneous with the first rubber compound.

In one form, the marking material has a surface that is flush with the exposed power transmission belt/belt sleeve surface to which it is applied.

In one form, the exposed surface of the power transmission belt/belt sleeve is defined by a covering canvas impregnated with a third rubber and the power transmission belt/ belt sleeve with the marking material applied thereto is vulcanized so that the first rubber compound on the substrate layer becomes homogenous with the third rubber of the covering canvas.

In one form, the power transmission belt has a body with a compression section, a tension section, and load carrying cords, with the marking material being applied to at least one of the tension section and the compression section.

The canvas layer may be provided on the tension section, with the marking material being applied to the canvas layer on the tension section.

The power transmission belt could be a number of different belt styles, including a V-ribbed belt.

In one form, the substrate layer is a paper that is one of cotton, rayon, polyamide, and polyester. The substrate layer may have a thickness of 0.01 to 0.1 mm, and more preferably 0.02 to 0.08 mm.

In one form, at least one of the first rubber compound and second rubber compound is at least one of natural rubber (NR), styrene-butadiene rubber (SBR), chloroprene rubber (CR), chlorosulphonated polyethylene rubber (CSM), hydrogenated nitric rubber (HNBR), and vinylpyridine-styrene-butadiene terpolymer.

At least one of the first rubber compound and second rubber compound may include at least one of a reinforcement additive, a plasticizer, a softener, an accelerator, and a vulcanizing agent.

The mark may be any type of indicia, such as a letter, numeral, symbol, etc.

The covering canvas may be a fabric woven from at least one of spun yarn and filament yarn. In the event that spun yarn is used, the yarn may be defined by at least one of natural fiber and synthetic fiber.

The invention also contemplates a process for producing a power transmission belt with a visible mark thereon. The process consists of the step of providing a molding drum, wrapping a plurality of layers around the molding drum to define a belt/belt sleeve body with an exposed rubber surface, providing a marking material defined by a first rubber compound with a first rubber and having a visible mark thereon, placing the marking material against the exposed rubber surface of the belt/belt sleeve body, and vulcanizing the belt/belt sleeve body with the marking material thereon so that the rubber in the exposed rubber surface of the belt body becomes homogeneous with the first rubber compound.

The marking material may be defined by providing a substrate layer defined at least in part by the first rubber compound and applying a mark defined by a second rubber compound with a second rubber that visibly contrasts with the first rubber compound in the substrate layer.

The belt/belt sleeve body may have one surface that contacts the molding drum and an oppositely facing surface, with the step of placing the marking material against the exposed rubber surface of the belt/belt sleeve body being the step of placing the marking material against the one surface. Alternatively, the marking material could be placed against the oppositely facing surface of the belt/belt sleeve body.

The method may include the step of attaching the marking material to the molding drum before wrapping the plurality of layers around the molding drum to thereby cause the marking material to be placed against the exposed rubber surface of the belt/belt sleeve body as the plurality of layers are wrapped around the marking material on the molding drum.

The step of providing the marking material may include the steps of providing a substrate material that is one of paper and nonwoven fabric and impregnating the one of paper and nonwoven fabric with the first rubber compound.

The step of impregnating the one of paper and nonwoven fabric may further involve the steps of dissolving the first rubber in a solvent to define a rubber cement and impregnating the one of paper and nonwoven fabric with the rubber cement.

The step of applying a mark may involve the steps of dissolving the second rubber in a solvent to define a rubber cement and applying the rubber cement to the substrate layer.

The step of applying a mark may include the step of providing a silicone oil in the second rubber.

The process may further include the step of pressing the marking material against the exposed rubber surface of the belt/belt sleeve body with a pressure of 6 to 12 kgf/cm$^2$ as the belt/belt sleeve body is vulcanized.

The process may further include the step of heating the belt/belt sleeve body with the marking material thereon to 150° to 170° C. as the belt/belt sleeve body is vulcanized.

The process may further include the step of placing the belt/belt sleeve body with the marking material thereon in a jacket during vulcanization.

The step of wrapping a plurality of layers may include the step of wrapping at least two rubber layers and a load carrying cord around the molding drum.

In one form of the invention, the mark has opposite sides, with one of the sides applied to the substrate layer. The step of placing the marking material involves the step of placing the marking material against the exposed rubber surface of the belt/belt sleeve body without there being any removable layer of material on the other of the opposite side of the mark to obviate the need to remove and discard a layer from the mark after application of the marking material.

The step of providing a marking material may include the steps of providing a substrate layer defined at least in part by the first rubber compound and applying a mark defined by a second rubber compound that has at least one of a different brightness and different color than the first rubber compound.

The step of wrapping a plurality of layers may include the step of wrapping a canvas layer that is impregnated with rubber around the molding drum so that the canvas layer defines at least a part of the exposed rubber surface of the belt/belt sleeve body.

The step of placing the marking material may include the step of placing the marking material against the exposed rubber surface of the belt/belt sleeve body so that the marking material is flush with the exposed rubber surface of the belt/belt sleeve body.

The invention also contemplates a process for applying a visible mark to a power transmission belt/belt sleeve, which process includes the steps of providing a component of the power transmission belt/belt sleeve having at least a portion defined by rubber, providing a marking material including a first rubber compound defining a substrate layer with a mark thereon, applying the marking material to the rubber on the portion of the component of the belt/belt sleeve, and vulcanizing the component of the belt/belt sleeve with the marking material thereon so that the substrate becomes homogeneous with the rubber on the portion of the component of the belt/belt sleeve.

With the inventive structure, it is impossible to integrate the substrate into the belt/belt sleeve without providing a separately removable substrate. If the marking material is vulcanized with the belt/belt sleeve, the marking material is united so that it is not prone to peeling.

At the same time, the marking material, once applied, remains flush with the surface to which it is applied, thereby avoiding depressions and projections as might produce noise when contacted by a cooperating pulley.

The invention permits a simple process to be utilized to positively integrate a mark into a power transmission belt without the need to remove any part of the marking material as might necessitate its disposal and complicate the manufacturing process.

DETAILED DESCRIPTION OF THE DRAWINGS

Figure 1:
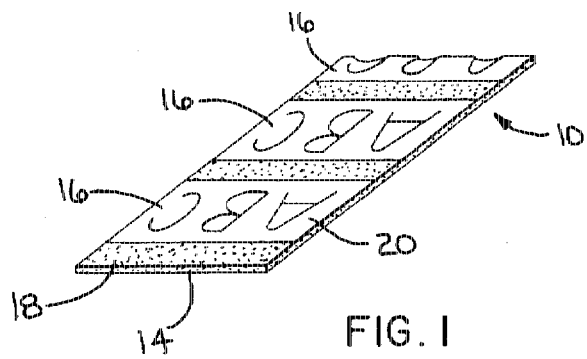
FIG. 1 is a fragmentary perspective view of a marking material, according to the present invention, including a substrate layer with a mark applied thereto.

In FIG. 1, a marking material, according to the present invention, is shown at 10. The marking material 10 is utilized to place visible information upon a power transmission belt, as shown at 12 in FIG. 5. The information may take a variety of different forms, to include a company name, a model number, a trademark, etc.

Referring again to FIG. 1, the marking material 10 is defined by a substrate layer 14 and a mark 16 applied to the substrate layer 14. As described more fully below, the substrate layer 14 is impregnated with a first rubber compound 18. The mark 16 is applied using a second, printing rubber compound 20 that is different from the first rubber compound in color and/or brightness.

The substrate layer 14 is in a preferred form one of paper or nonwoven fabric that is impregnated with a cement formed from the first rubber compound 18. The paper is made from natural fiber. In the event the substrate layer 14 is a nonwoven fabric, the fabric is made of either natural or synthetic fibers, such as cotton, rayon, polyamide, and polyester.

The substrate layer 14 is in the range of 0.01 to 0.1 mm thick and more preferably 0.02 to 0.08 mm thick. It has been found that damage to the substrate, such as warping or wrinkling thereof, may occur with the substrate layer 14 having a thickness less than 0.01 mm when the mark 16 is applied thereto. If the thickness of the substrate layer 14 exceeds 0.1 mm, the substrate layer 14 is prone to falling off upon engaging a pulley in use.

The first rubber compound 18 is preferably a vulcanizable rubber compound. Suitable rubbers for this purpose are natural rubber (NR), styrene-butadiene rubber (SBR), chloroprene rubber (CR), chlorosulphonated polyethylene rubber (CSM) and hydrogenated nitrile rubber (HNBR). These rubbers can be treated with an additive, such as carbon black for reinforcement, a plasticizer, a softener, an accelerator, or vulcanizing agent.

The rubber compound 18 is dissolved in a solvent, such as toluene and methyl ethyl ketone, to produce a rubber cement. The rubber cement is applied to the substrate layer 14 and then dried to eliminate the solvent.

The rubber compound 18 may also be prepared without using a vulcanizing agent. In this case, the rubber compound 18 is vulcanized through the vulcanizing agent in the rubber layer on the belt/belt sleeve which contacts the substrate layer 14. However, a vulcanizable rubber compound is preferred.

The rubber in the first rubber compound 18 may be a latex that is one of natural rubber (NR), styrene-butadiene rubber (SBR), chloroprene rubber (CR), chlorosulphonated polyethylene rubber (CSM), hydrogenated nitrile rubber (HNBR), or vinylpyridine-styrene-butadiene terpolymer.

The printing rubber compound 20 is a rubber cement prepared by dissolving a vulcanizable or unvulcanizable rubber compound in a solvent, such as toluene and methyl ethyl ketone. The rubber compound 20 may be any of natural rubber (NR), styrene-butadiene rubber (SBR), chloroprene rubber (CR), chlorosulphonated polyethylene rubber (CSM) and hydrogenated nitrile rubber (HNBR). An additive, such as a pigment, carbon black for reinforcement, a plasticizer, a softener, an accelerator, and a vulcanizing agent may be used.

The rubber compound 20 may have silicone oil incorporated therein, although this is not necessary. If silicone oil is used, it is preferably added in an amount of 30–40 weight percent solution dissolved in the solvent described in the prior paragraph. The silicone oil solution is added in an amount of 0.15 to 0.40 parts by weight per 100 parts by weight of the rubber in second rubber compound 20.

If the silicone oil solution is present in an amount less than 0.15 parts by weight, the mark 16 tends to "block" when the marking material 10 is wrapped. With the silicone oil present in an amount in excess 0.40 parts by weight, the silicone oil solution prevents adhesion of the printing rubber compound 20 to the substrate layer 14, as a result of which the mark 16 becomes blurred when the marking material 10 is wrapped around itself or onto a cylinder.

The marking material 10 is applied in the following matter, as seen with respect to FIGS. 2 and 4. The marking material 10 is placed against the outer surface 22 of a cylindrical molding drum 24 along the entire axial extent thereof, which is indicated by the double-headed arrow 26. The marking material 10 is applied so that the mark 16 thereon faces the molding drum surface 22. The layers of the power transmission belt 12 are then built sequentially around the molding drum 24. An exemplary order of layers, to produce the belt 12 is described below. However, it should be understood that virtually any combination of belt components is contemplated by the present invention.

A canvas layer 28 is first applied, followed by an adhesion rubber layer 30. Any number of canvas layers 28 could be used. The outside surface 32 of the adhesion rubber layer 30 is wrapped with load carrying cords 34 in a spiral pattern. The load carrying cords may be made from polyester or aramid fiber. A compression rubber layer 36 is then wrapped over the cords 34 to produce a belt sleeve 38 from which a plurality of the power transmission belts 12 can be severed. The belt sleeve 38 is placed in a jacket 39 to be vulcanized.

Figure 2:
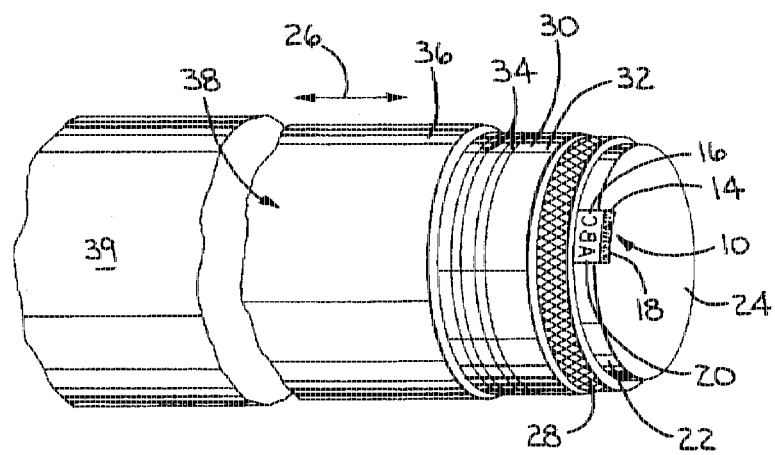
FIG. 2 is a perspective view of a belt sleeve defined by component layers wrapped around a forming drum and partially broken away to expose the inventive marking material on the innermost layer.
Figure 4:
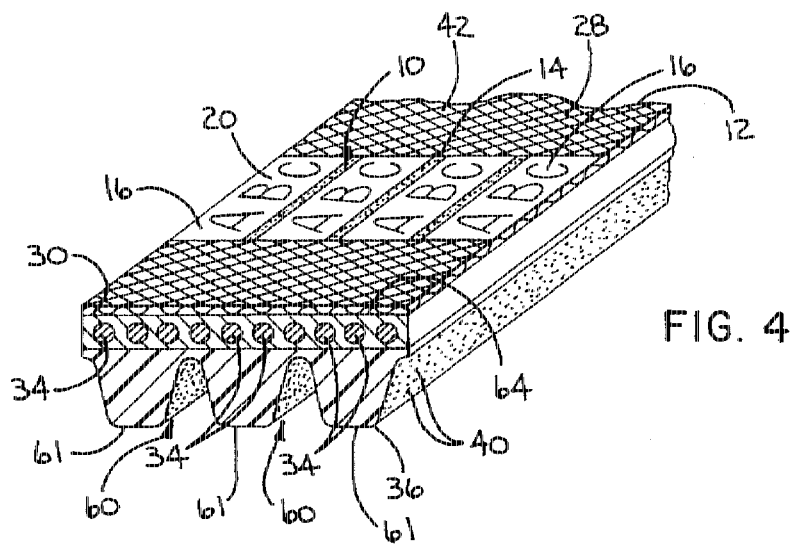
FIG. 4 is a fragmentary perspective view of a V-ribbed belt having a marking material, according to the present invention, thereon.

While the precise composition and arrangement of components is not critical to the present invention, an exemplary belt construction is shown in FIGS. 2 and 4. In this construction, the canvas layer 28 is a fabric woven from spun yarns or filament yarns. The spun yarns are formed from natural fiber, such as cotton, or synthetic fiber, such as polyamide or polyester. Alternatively, the spun yarns may be a mixture of natural and synthetic fibers. The filament yarns are prepared by twisting a multiplicity of filaments of synthetic fiber. The canvas may be a plain weave or a twill weave. It may be stretchable, with the warp and weft yarns crossed at an angle of 90°–120°.

The compression rubber layer 36 is shown to have embedded therein laterally oriented, cut fibers 40. These fibers 40 may be aramid fibers, polyester fibers, nylon fibers, cotton fibers, etc. Preferably, the fibers 40 have a length of 1–10 mm and are present in an amount of 1–15 volume percent.

During vulcanization, the substrate layer 14 is pressed against the canvas layer 28 with a pressure of 6–12 kgf/cm$^2$ and simultaneously heated to 150°–170° C. The first rubber compound 18 is vulcanized and becomes integral/homogeneous with the canvas layer 28.

As a result of this process, the marking material 10 is flush with the surface 42 on the canvas layer to which it is applied. The mark 16 is likewise flush with the substrate layer 14 to which it is applied.

An additional advantage is that the substrate layer 14 becomes integral with the surface to which it attaches. Consequently, no part of the marking material 10 need be peeled after vulcanization. The removal of the substrate layer in the prior art processes adds a manufacturing step and requires collection and disposal of the substrate material scraps.

Figure 3:
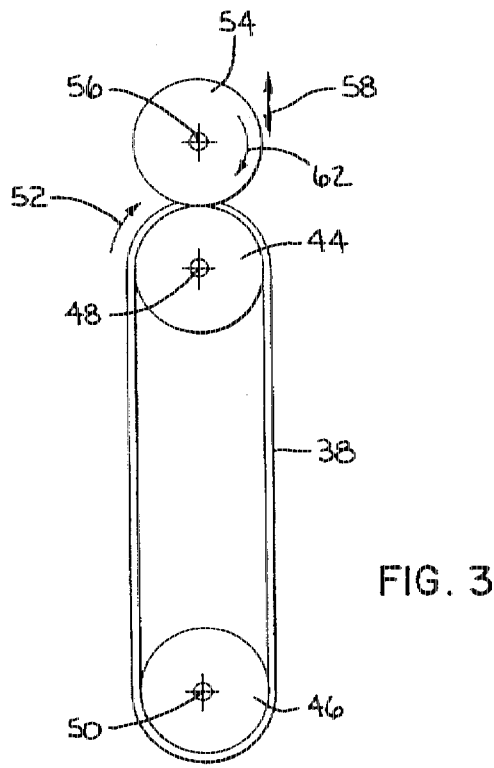
FIG. 3 is a schematic elevation view of a system for cutting grooves in a continuously running belt sleeve.

The belt sleeve 38 is removed from the molding drum 24 and trained around a pair of pulleys 44, 46, as seen in FIG. 3. The pulleys 44, 46 are driven around substantially parallel axes 48, 50, respectively. The belt sleeve 38 is kept in the same configuration as in FIG. 2, i.e. with the canvas layer 28 exposed, and run at a predetermined tension. The running speed is not critical. The direction of movement of the belt is indicated by the arrow 52.

A rotating grinding wheel 54 is situated adjacent to the pulley 44 with its central axis 56 parallel to the axis 48 of the pulley 44. The grinding wheel 54 is movable in the direction of the arrow 58 towards and against the surface 42 on the belt sleeve 38 to define lengthwise grooves with ribs 61 therebetween. The grinding wheel 54 has a grinding surface that produces 3–100 V-grooves 60 (FIG. 4) simultaneously in the belt sleeve 38.

The rotational direction of the grinding wheel 14 is shown, as indicated by the arrow 62, to be opposite to the direction of movement of the belt sleeve 38. However, the grinding wheel 54 could be rotated in the same direction as the belt sleeve 38 moves. The grinding wheel 54 is preferably run at a speed of 400–2400 rpm. A suitable procedure for grinding is described in Japanese Patent Laid-Open No. 200906/1993.

Once the grooves 60 are formed in the belt sleeve 38, individual belts 12 can be cut from the belt sleeve 38. The severed belts 12 are then turned inside out to the orientation shown in FIG. 4. The belt 12 in FIG. 4 has load carrying cords 34 embedded in the adhesion rubber layer 30. The canvas layer 28 is provided on the outside surface 64 of the adhesion rubber layer 30, with the compression rubber layer 36 provided on the inside of the adhesion rubber layer 30.

Figure 5:
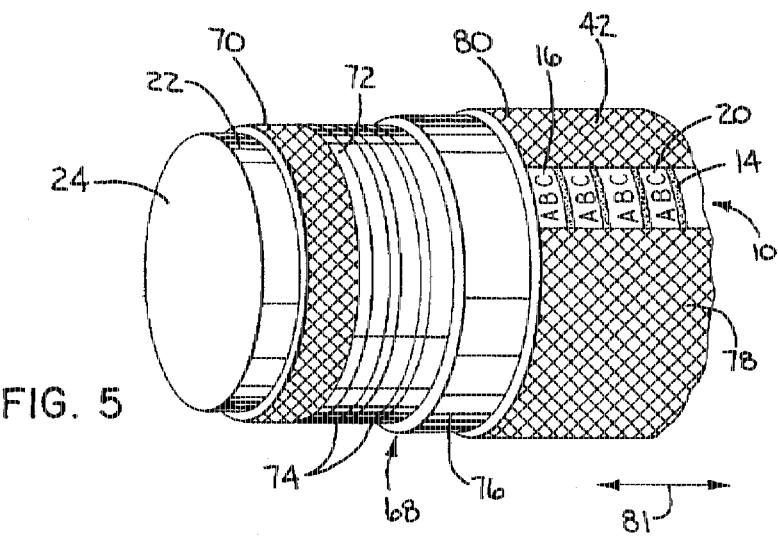
FIG. 5 is a view as in FIG. 2 with the marking material applied to the outermost layer wrapped around the forming drum.

In FIG. 5, another embodiment of the invention is shown. Whereas the belt sleeve 38 in FIG. 2 is formed in an inside out manner, the belt sleeve 68 is formed with the belt sleeve 68 in a normal orientation. In FIG. 5, a canvas layer 70, impregnated with rubber, is applied to the outer surface 22 of the forming drum. Additional canvas layers 70 (not shown) could be applied. A compression rubber layer 72, load carrying cords 74, an adhesive rubber layer 76 and a canvas layer 78 are consecutively wound around the molding drum 24. Additional canvas layers 78 can be provided on the outside of the adhesion rubber layer 76.

The marking material 10 is applied to the outer surface 80 of the outermost canvas layer 78 along the entire width of the molding drum 24, identified by the double-headed arrow 81, with the side of the marking material 10 with the mark 16 thereon facing away from the outer surface 80 of the canvas layer 78.

The belt sleeve 68 with the marking material 10 thereon is vulcanized within the jacket 39 and removed from the molding drum 24. The vulcanized belt sleeve 68 can then be placed onto a rotating drum (not shown) and cut into individual V-belts using a conventional cutter.

It is also contemplated that the marking material 10 could be applied directly to the adhesion rubber layer 76 without the use of a rubber impregnated canvas layer 78.

The inventive belt, as shown in FIG. 4 and made according to the inventive process, was tested side-by-side with belts having a transfer mark applied thereto in conventional fashion to compare sound pressure developed during running.

The Inventive Belt

The inventive belt tested was prepared by impregnating a paper substrate, having a 0.025 mm thickness, with a rubber cement obtained by dissolving chloroprene rubber in a toluene solvent. The rubber compound, the composition of which is shown in Table 1 below, was allowed to dry at room temperature.

TABLE 1

| | Parts by Weights |
|---|---|
| Chloroprene | 100 |
| Zinc Oxide | 5 |
| Stearic acid | 1 |
| Carbon black FEF | 40 |
| Plasticizer | 20 |
| Vulcanization accelerator CM * | 1 |
| Vulcanization accelerator TT ** | 1 |
| Sulfur | 0.5 |

\* N-cyclohexyl-2-benzothiazylsulfenamide
\** tetramethylthiuram disulfide

On the surface of the substrate, letters were applied with a printing rubber composition which included 100 parts by weight of rubber cement and 0.30 weight percent of toluene solution containing 30–40 weight percent silicone oil. The rubber cement was made with the natural rubber compound shown in Table 2.

TABLE 2

|  | Parts by Weight |
| --- | --- |
| Natural rubber | 100 |
| Zinc oxide | 3 |
| Stearic acid | 1 |
| Pigment | 10 |
| Plasticizer | 20 |
| Vulcanization accelerator CM | 1 |
| Vulcanization accelerator TT | 1 |
| Sulfur | 2 |

The inventive belt sleeve was fabricated in the following manner. The marking material 10 was placed on the surface 22 of the cylindrical molding drum 24 along the entire axial extent thereof, with the printed mark 16 facing the surface of the drum 24. One ply of covering canvas 28 was wrapped around the marking material 10 on the molding drum. The canvas 28 was a rubberized, stretchable, plain woven fabric, with warp and weft yarns crossing at an angle of approximately 110°.

The covering canvas 28 was wrapped with an adhesion rubber layer 30 made of chloroprene rubber. Load carrying cords 34, made of polyester fiber, were wrapped around the adhesion rubber layer 30. The outer layer of the belt sleeve was formed by the compressible rubber layer 36 having cut fibers 40 therein. The fiber content was 8 volume percent of 6 mm long nylon fibers and 3 volume percent of 3 mm long aramid fibers. The fibers projected laterally of the belt sleeve i.e. axially of the drum.

The belt sleeve 38 was vulcanized at 170° for 27 minutes.

The belt sleeve 38 was ground with the wheel 54 and cut to define V-ribbed belts each having three ribs (3PK1100).

Comparative Belts

The comparative V-belts were made in the following manner. A transfer marking material, defined by a substrate of 50 μm thick polyacetate film, was printed with a rubber cement ink. The transfer marking material was placed on the surface 22 of the cylindrical molding drum 24 along its entire axial extent, with the substrate facing the surface of the drum.

The molding drum 24 was wrapped consecutively with a covering canvas, a cushion rubber layer, load carrying cords, and a compression rubber layer, in the same manner as that for the inventive belt. The resulting belt sleeve was vulcanized at 170° C. for 27 minutes. After the vulcanization process was completed, the substrate was peeled off of the belt sleeve.

The belt sleeve was ground with a grinding wheel and cut in the same manner to produce a three rib, V-belt 12' (3PK1100).

The transfer mark, with the substrate removed, had a level difference of 0.04 to 0.05 with the surface on which it was applied.

Test System

Figure 6:
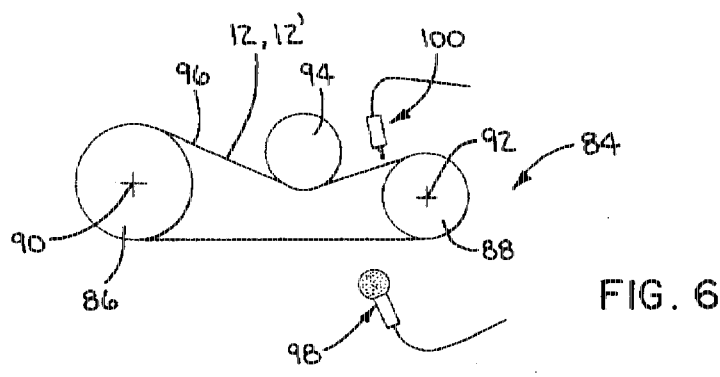
FIG. 6 is a schematic representation of a system used to test noise generated during running of a belt having a marking material according to the present invention thereon.

The belts 12, 12' were driven on a system as shown at 84 in FIG. 6. The system 84 included a drive pulley 86 and a driven pulley 88. The pulleys 86, 88 were rotated around parallel axes 90, 92, respectively. The drive pulley 86 had a diameter of 140 mm with the driven pulley 88 having a diameter of 95 mm.

An idler pulley 94, having a 90 mm diameter, was pressed against the back surface 96 of the inventive belt 12 and the comparative belt sample 12'.

The belts 12, 12' were tested for noise generation at a running speed of 5.1 m/s at room temperature. Noise, in terms of sound pressure, was measured by means of a microphone 98. The speed of the running belts 12, 12' was measured by means of a fiber sensor 100, which was capable of detecting the passage of the mark by using reflected rays. The microphone 98 and sensor 100 were both placed adjacent to the driven pulley 88.

Figure 7:
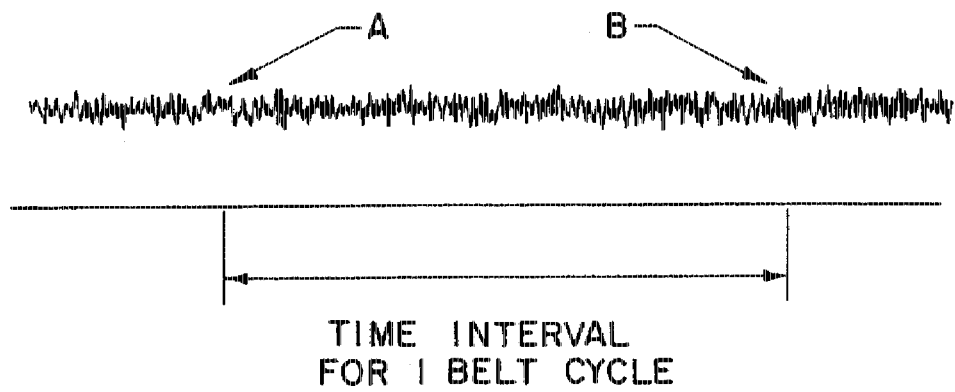
FIG. 7 is a recording chart showing the waveform of the sound pressure produced by a running power transmission belt with the inventive marking material thereon.
Figure 8:
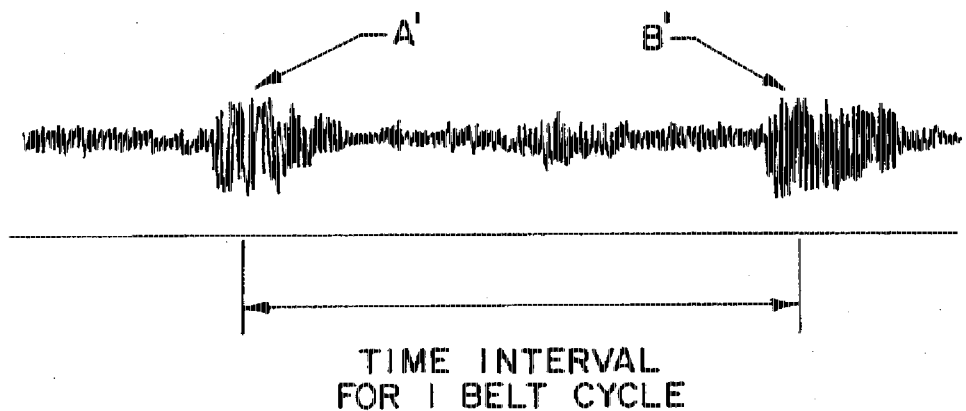
FIG. 8 is a recording chart showing the waveform of the sound pressure produced by a running power transmission belt having a marking thereon that is at a different level than the surface to which it is applied.

The relationship between time and sound pressure was measured and recorded as shown in FIGS. 7 and 8. On the recordings, the locations A and B identify the times when the mark 16 passed the pulley 94. It can be seen that there is no identifiable increase in sound pressure attributable to the mark 16.

On the other hand, in FIG. 8, the comparative belt showed a significant increase in sound pressure attributable to the mark on the belt 12' (see locations A' and B').

The foregoing disclosure of specific embodiments is intended to be illustrative of the broad concepts comprehended by the invention.

We claim:

1. A process for producing a power transmission belt with a visible mark thereon, said process comprising the steps of:

providing a molding drum;

wrapping a plurality of layers around the molding drum to define a belt/belt sleeve body with an exposed surface defined at least in part by rubber;

providing a marking material comprising a first rubber compound comprising a first rubber and having a visible mark thereon;

placing the marking material against the exposed rubber surface of the belt/belt sleeve body; and vulcanizing the belt/belt sleeve body with the marking material thereon so that the rubber in the exposed rubber surface of the belt body becomes homogenous with the first rubber compound, wherein the step of providing a marking material comprises the step of providing a substrate material that is one of paper and nonwoven fabric and impregnating the one of paper and nonwoven fabric with the first rubber compound.

2. The process according to claim 1 wherein the step of impregnating the one of paper and nonwoven fabric comprises the step of dissolving the first rubber in a solvent to define a rubber cement and impregnating the one of paper and nonwoven fabric with the rubber cement.

\* \* \* \* \*